United States Patent [19]

Fujiwara et al.

[11] Patent Number: 5,213,013
[45] Date of Patent: May 25, 1993

[54] LINE PRESSURE CONTROL SYSTEM FOR AUTOMATIC TRANSMISSION

[75] Inventors: Takuji Fujiwara; Kozo Ishii; Kazuo Takemoto; Hiroshi Yoshimura, all of Hiroshima, Japan

[73] Assignee: Mazda Motor Corporation, Hiroshima, Japan

[21] Appl. No.: 770,158

[22] Filed: Oct. 3, 1991

Related U.S. Application Data

[63] Continuation of Ser. No. 424,827, Oct. 20, 1989, abandoned.

[30] Foreign Application Priority Data

Oct. 22, 1988 [JP] Japan .................. 63-266996

[51] Int. Cl.⁵ .............................................. B60K 41/06
[52] U.S. Cl. ................................... 74/866; 74/867
[58] Field of Search .................. 74/866, 867, 844; 364/424.1

[56] References Cited

U.S. PATENT DOCUMENTS

| | | | |
|---|---|---|---|
| 4,502,354 | 3/1985 | Suzuki et al. | 74/866 |
| 4,509,124 | 4/1985 | Suzuki et al. | 364/424.1 |
| 4,779,489 | 10/1988 | Haley | 74/844 |
| 4,791,568 | 12/1988 | Hiramatsu et al. | 74/866 X |
| 4,807,132 | 2/1989 | Arai et al. | 74/866 X |
| 4,845,618 | 7/1989 | Narita | 364/424.1 |
| 4,870,581 | 9/1989 | Ito et al. | 74/866 X |
| 4,898,049 | 2/1990 | Niikura | 364/424.1 X |
| 4,919,012 | 4/1990 | Bolz | 74/866 |
| 4,922,424 | 5/1990 | Hiramatsu | 74/866 X |

FOREIGN PATENT DOCUMENTS

| | | | |
|---|---|---|---|
| 260088 | 3/1988 | European Pat. Off. | 74/866 |
| 49-30051 | 8/1974 | Japan . | |
| 54-2349 | 2/1979 | Japan . | |
| 56-10851 | 2/1981 | Japan . | |
| 58-137652 | 8/1983 | Japan . | 364/424.1 |
| 59-62756 | 4/1984 | Japan | 364/424.1 |

Primary Examiner—Richard Lorence
Assistant Examiner—Benjamin Levi
Attorney, Agent, or Firm—Fleit, Jacobson, Cohn, Price, Holman & Stern

[57] ABSTRACT

A hydraulic pressure control system for an automatic transmission includes a multiple transmission gear mechanism having a plurality of gear stages and frictional elements for switching power transmitting paths in the transmission gear mechanism, a hydraulic control mechanism for controlling engagement and disengagement of the frictional elements to establish one of said gear stages, and a line pressure control device for controlling line pressure of the hydraulic control mechanism. A speed detecting device for detects a speed of an input element of the transmission gear mechanism during shift operation of the shift gear stage in the transmission gear mechanism, and a compensation device compensates the line pressure in accordance with signal from the speed detecting device. The line pressure is compensated by a learning control to reduce a torque shock due to the shift operation.

8 Claims, 13 Drawing Sheets

| THROTTLE OPENING<br>STAGE | 0/8 | 1/8 | | 7/8 | 8/8 |
|---|---|---|---|---|---|
| 1→2 | (Pℓ) | ---- | | ---- | ---- |
| 1→3 | ---- | ---- | | ---- | ---- |
| 1→4 | ---- | ---- | | ---- | ---- |
| 2→3 | ---- | ---- | | ---- | ---- |
| 2→4 | ---- | ---- | | ---- | ---- |
| 3→4 | ---- | ---- | | ---- | ---- |

| STAGE \ TURBINE SPEED | 0 | 750 | | 5250 | 6000 |
|---|---|---|---|---|---|
| 3 → 2 | (PℓO) | ----- | | ----- | ----- |

LINE PRESSURE CONTROL SYSTEM FOR AUTOMATIC TRANSMISSION

This is a continuation of application Ser. No. 07/424,827, filed Oct. 20, 1989, now abandoned.

BACKGROUND OF THE INVENTION

1. Field of the Invention

The present invention relates to a control system for an automatic transmission of a motor vehicle, and more specifically to a line pressure control for a hydraulic control mechanism of the transmission.

2. Description of the Prior Art

Generally, an automatic transmission of a motor vehicle is provided with a torque converter, and a transmitting mechanism employing a planetary gear mechanism. The transmission is also provided with a plurality of frictional elements, such a clutches and brakes, for establishing a desirable shift gear stage among the plurality of shift gear stages provided in the transmission. For this purpose, a hydraulic control circuit is provided with a plurality of solenoid valves for switching oil passages in the circuit so that the frictional elements are engaged and disengaged to perform a desirable shift operation.

Japanese Patent publication No. 54-2349, issued to Ford Motor corporation and published for opposition on Feb. 6, 1979, discloses a basic electrical hydraulic control system for an automatic transmission.

Switching operation of the oil passages of the hydraulic circuit must be timely done; otherwise, there might be produced a torque shock resulting form unusual change in engine and/or turbine speed.

In view of the above, there has been proposed controlling engaging force of the frictional elements to obviate the torque shock during a shift operation of the transmission. For instance, Japanese Patent Public Disclosure No. 56-10851, laid open to the public in 1981, discloses a hydraulic control in which the hydraulic pressure introduced to the frictional element is controlled to gradually change the engaging force of the frictional elements and controlled to reduce the difference between a target time period for shift operation and an actual time period thereof.

Japanese Patent Publication Nos. 49-30051, published for opposition on Aug. 9, 1974, and 61-48021, corresponding to U.S. Pat. No. 4,502,354 and published for opposition on Oct. 22, 1986, disclose similar control system for obviating the torque shock due to shift operations.

However, the conventional hydraulic control mechanisms as such disclosed in these Japanese Patent applications are disadvantageous in that the hydraulic pressure control based on the shift operation time period is not accurate, and thus not so effective in controlling the speed change of the engine and/or the turbine.

SUMMARY OF THE INVENTION

It is, therefore, an object of the present invention to provide a line pressure control system of a hydraulic circuit for an automatic transmission which can suppress a torque shock during a shift operation of the transmission effectively.

It is another object of the present invention to provide a line pressure control system which can suppress an unusual increase and decrease of turbine speed during shift operation of the transmission.

It is still another object of the present invention to provide a hydraulic control system for an automatic transmission in which a proper switching timing can be provided for frictional elements of the transmission during a shift operation thereof.

The above and other objects of the present invention can be accomplished by a hydraulic pressure control system for an automatic transmission comprising a multiple transmission gear mechanism having a plurality of gear stages and frictional elements for switching power transmitting paths in the transmission gear mechanism, a hydraulic control mechanism for controlling engagement and disengagement of the frictional elements to establish one of said gear stages, a line pressure control device for controlling line pressure of said hydraulic control mechanism, a speed detecting device for detecting a speed of an input element of the transmission gear mechanism during shift operation of the shift gear stage in the transmission gear mechanism, and a compensation device for compensating the line pressure in accordance with signal from the speed detecting device.

According to the present invention, when an unusual increase or decrease in the speed of the input element of the transmission gear mechanism is detected during the shift operation, the line pressure is compensated to optimize switching timing of the frictional elements to thereby reduce a torque shock in the shift operation in the automatic transmission.

The above and other features of the present invention will be apparent from the following description, taking reference to the accompanying drawings.

DESCRIPTION OF THE PREFERRED EMBODIMENT

Figure 1:
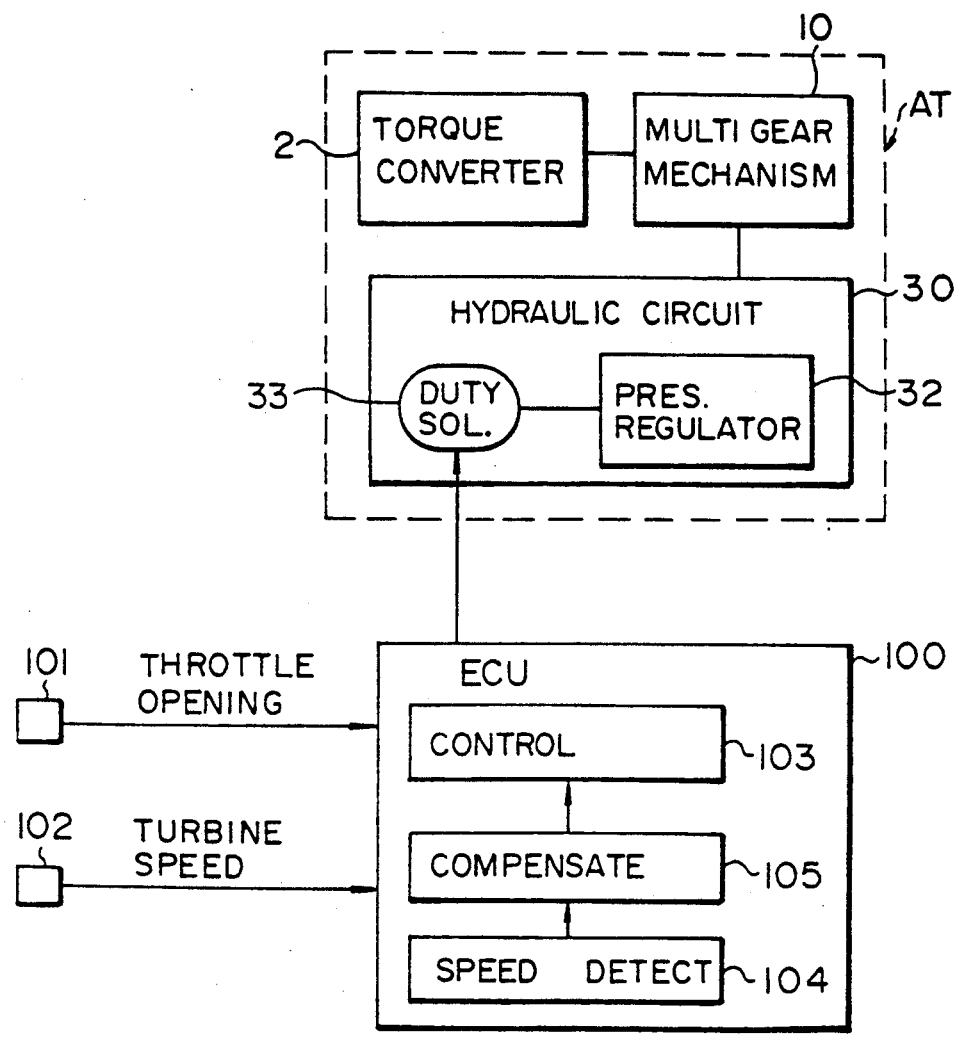
FIG. 1 is a schematic view of a hydraulic control system in accordance with the present invention.

Referring to the drawings, specifically to FIG. 1, an automatic transmission AT is provided with a torque converter 2, a multiple stage transmission gear mechanism 10 and a hydraulic control circuit 30 therefor. The transmission gear mechanism 10 is provided with a plurality of frictional elements, such as clutches and brakes, for switching power transmitting path therein. The engagement and disengagement of the frictional elements are controlled by the hydraulic control circuit 30. The hydraulic control circuit 30 is provided with a pressure regulating valve 32 for adjusting a line pressure introduced into the frictional elements and a duty solenoid valve 33 for controlling the regulating valve 32, which constitute a line pressure control mechanism.

There is provided an electronic control unit (ECU) 100 constituted by a microcomputer and the like for controlling the hydraulic control circuit 30. The control unit 100 receives a signal from a throttle sensor 101 for detecting an opening of throttle valve (not shown), a turbine speed sensor 102 for detecting turbine speed or rotation speed of an input element of the transmission gear mechanism 10, and the like.

The control unit 100 includes a line pressure control device 103 for controlling the duty solenoid valve 33 to thereby control the line pressure of the hydraulic control circuit 30, speed detecting device 104 for detecting the turbine speed, specifically an increase and decrease thereof during a shift operation of the transmission gear mechanism 10, and a compensation device 105 for compensating the line pressure of the hydraulic control circuit 30 in accordance with the change in the turbine speed.

The control unit 100 controls solenoid valve 37, 40 and 42 to perform a shift control in accordance with an engine operating condition obtained through the throttle opening and the turbine speed or vehicle speed based on a predetermined shift pattern, and also controls a lock-up solenoid valve 51 to thereby control a lock-up clutch 29 for establishing a lock-up condition.

The speed detecting device 104 may detect an engine speed in lieu of the turbine speed.

Figure 2:
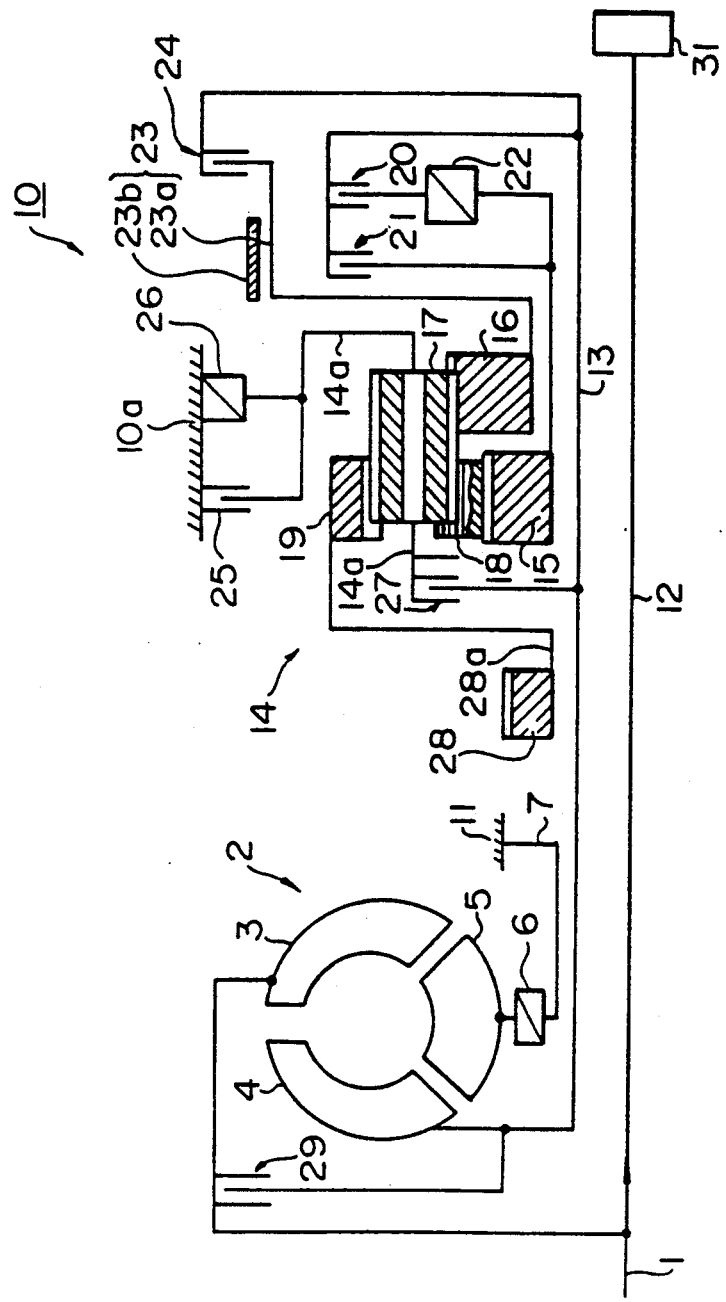
FIG. 2 is a sectional view showing an automatic transmission provided with torque converter and a hydraulic circuit to which the present invention can be applied.

Referring to FIG. 2, there is shown a structure of the automatic transmission AT in which the torque converter 2 is joined with an engine output shaft 1 and the multiple transmission gear mechanism 10 is connected with an output member of the torque converter 2.

The torque converter 2 is provided with a pump 3 connected with the engine output shaft 1, a turbine 4 and a stator 5 mounted on a shaft 7 through one-way clutch 6.

The gear mechanism 10 comprises an oil pump drive shaft 12 connected with the engine output shaft 1 at base end and with an oil pump 31 at a tip end thereof, a hollow turbine shaft 13 connected with the turbine 4 at base end outside of the oil pump drive shaft 12 and Ravigneaux-type planetary gear mechanism 14 around the turbine shaft 13. The planetary gear mechanism 14 is provided with a small sun gear 15 and a large sun gear 16 which are disposed side by side in a longitudinal direction of the transmission gear mechanism 10. The planetary gear mechanism 14 is also provided with a short pinion gear 18, a long pinon gear 17 meshed with the large sun gear 16 and the short pinion gear 18, and a ring gear 19 meshed with the long pinion gear 17.

There are provided a forward clutch 20 and a coast clutch 21 side by side as frictional elements between the turbine shaft 13 and the small sun gear 15. The small sun gear 15 is connected with the turbine shaft 13 through the forward clutch 20 located rearward of the large sun gear 16 and a first one-way clutch 22 connected with the forward clutch 20 for preventing a reverse rotation of the turbine shaft 13. The coast clutch 21 is also arranged between the turbine shaft 4 and the small sun gear 15 in a row with the forward clutch 20 and the one-way clutch 22.

Outside of the coast clutch 21, there is disposed a 2-4 brake 23 provided with a brake drum 23a connected with the large sun gear 16 and a brake band 23b adapted to be engaged with the brake drum 23a so that when the 2-4 brake is engaged, the large sun gear is fixed. A reverse clutch 24 is arranged rearward of the brake 23 for controlling a power transmission between the large sun gear 16 and the turbine shaft 13 through the brake drum 23a to thereby establish a reverse shift stage.

There is provided a low & reverse brake 25 between a carrier 14a of the planetary gear mechanism 14 and a casing 10a of the transmission gear mechanism 10 for controlling the engagement and disengagement between the carrier 14a and the casing 10a. The long pinion 17 is connected with the low & reverse brake 25 for fixing the long pinion 17 and with a second one-way clutch 26 arranged in a row with the brake 25 for allowing a rotation of the long pinion 17 in the same direction as the engine output shaft 1.

A 3-4 clutch 27 is arranged in front of the planetary gear mechanism 14 for controlling the engagement and disengagement of the carrier 14a and the turbine shaft 13. An output gear 28, disposed in front of the 3-4 clutch 27 is connected with the ring gear 19 through an output shaft 28a. Numeral 29 denotes a lock-up clutch for directly connecting the engine output shaft 1 with the turbine shaft 13.

The multiple transmission gear mechanism 10, as illustrated, is provided with four shift gear stages for forward movement and one shift gear stage for reverse movement. The clutches 20, 21 24 and 27 and brakes 23 and 25 are controlled to establish a desirable shift gear stage among the plurality of the shift gear stages.

Table 1 shows operations of the respective clutches and brakes in the respective shift gear stages of the transmission.

TABLE 1

| REFERENCE | CLUTCH | | | | BRAKE | | ONE-WAY CLUTCH | |
|---|---|---|---|---|---|---|---|---|
| | 24 | 20 | 21 | 27 | 25 | 23 | 26 | 22 |
| P | | | | | | | | |
| R | O | | | | O | | | |
| N | | | | | | | | |
| D RANGE | | | | | | | | |
| 1 | | O | | | | | (O) | (O) |
| 2 | | O | | | | O | | (O) |

TABLE 1-continued

| REFERENCE | CLUTCH | | | | BRAKE | | ONE-WAY CLUTCH | |
|---|---|---|---|---|---|---|---|---|
|  | 24 | 20 | 21 | 27 | 25 | 23 | 26 | 22 |
| 3 |  | O | O | O |  |  |  | (O) |
| 4 |  | O | O |  |  | O |  |  |
| 2 RANGE | | | | | | | | |
| 1 |  | O |  |  |  |  | (O) | (O) |
| 2 |  | O | O |  |  | O |  | (O) |
| 3 |  | O | O | O |  |  |  | (O) |
| 1 RANGE | | | | | | | | |
| 1 |  | O | O |  | O |  |  | (O) |
| 2 |  | O | O |  |  | O |  | (O) |

In table 1, reference O means that the corresponding element is under operation for transmitting a torque but the corresponding element to reference (O) is effected to transmit the power only when it functions as a driving element.

Hereinafter, the hydraulic circuit 30 will be explained in connection with operations of the above frictional elements, taking reference to FIG. 3.

Figure 3:
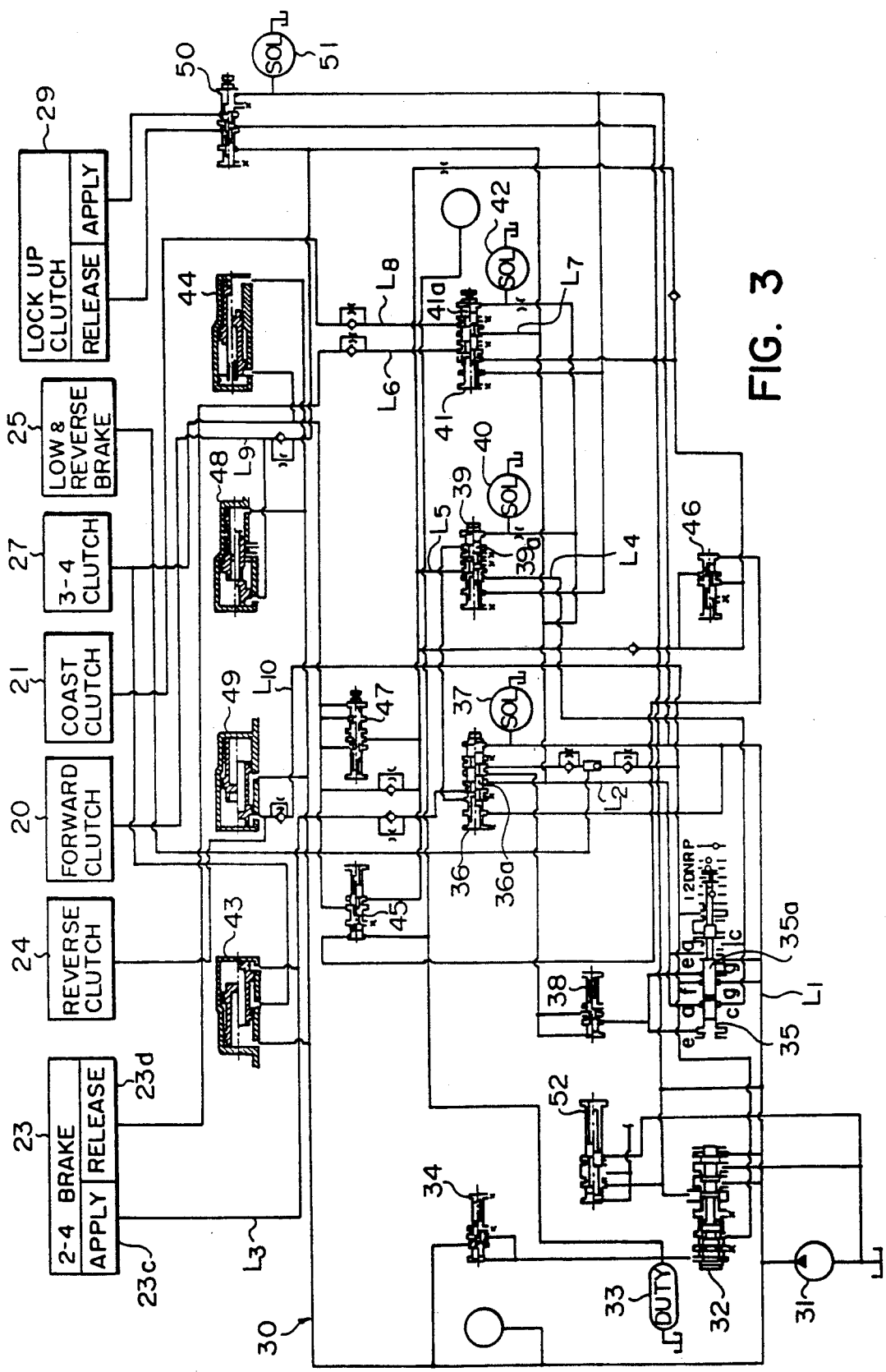
FIG. 3 is a hydraulic control circuit in accordance with a preferred embodiment of the present invention.

As shown in FIG. 3, the oil pump 31 discharges a hydraulic fluid to the hydraulic passage L1. The hydraulic pressure of the fluid is introduced into the pressure regulating valve 32. The pressure regulating valve 32 is controlled by the duty solenoid valve 33 to adjust the line pressure of the hydraulic control circuit 30. In detail, the hydraulic pressure from the pump 31 is reduced in a reducing valve 34 to a predetermined value. Thereafter, the hydraulic pressure is subjected to a duty control of the solenoid valve 33 and introduced into the pressure regulating valve 32 as a pilot pressure therefor. Thus, the line pressure control of the hydraulic control circuit 30 is established. The regulated line pressure is introduced into a port g of a manual shift valve 35. The manual shift valve 35 is provided with a spool 35a connected with a select lever and associated with the lever so that the spool 35a can be moved in accordance with a manual operation for the select lever by a driver to the range D in which the gear shift operation is automatically made among the four forward gear stages, the range 2 in which the gear shift operation is automatically made among the first through a third gear stages of the transmission, the range 1 in which the gear shift operation is automatically made between the first and second gear stages and a reverse range R, a parking range P, a neutral range N.

The port g is communicated with ports a and e when value 35 is set at the range 1, with ports a and c when value 35 is set in the range 2 and D, and with a port f when the value 35 is set at the reverse range R.

The port a of the manual shift valve 35 is connected with a 1-2 shift valve 36 through the hydraulic line L2. The 1-2 shift valve 36 is subjected to a pilot pressure which is adapted to be controlled by a 1-2 solenoid valve 37. When the shift stage is the first stage, the 1-2 solenoid valve 37 is turned off so that a spool 36a thereof is moved toward the left end to connect a hydraulic passage L3 communicated with an apply chamber 23c of the 2-4 brake 23 to a draining port. When the shift stage is the second to fourth stages, the 1-2 solenoid valve 37 is turned on so that the spool 36a is moved toward the right end in the drawing. As a result, the hydraulic pressure is introduced from the port a into the apply chamber 23c of the 2-4 brake 23. When the shift stage is the first stage in the range 1, the 1-2 shift valve introduces the hydraulic pressure supplied from the port e of the manual shift valve 35 through a low reducing valve 38 into the low & reverse brake 25.

The hydraulic pressure from the port a of the manual shift valve 35 is applied to a 2-3 shift valve 39 as a pilot pressure as well. The 2-3 shift valve 39 is connected with the port c of the manual valve 35 through a hydraulic passage L4. The pilot pressure therefor is controlled by a 2-3 solenoid valve 40. When in the first and second stages, the 2-3 solenoid valve 40 is turned on, causing a spool 39a of the valve 40 to be moved rightward so that a hydraulic passage L5, communicated with the 3-4 clutch 27, is connected with a draining passage to release the 3-4 clutch 27.

When in the third and fourth stages, the 2-3 solenoid valve 40 is turned off, causing the spool 39a to be moved leftward so that the hydraulic pressure from the port c introduced into the hydraulic passage L5 to establish an engagement of the 3-4 clutch 27.

The hydraulic passage L5 is also connected with a 3-4 shift valve 41, subjected to a pilot pressure controlled by a 3-4 solenoid valve 42. When the shift stage is the first, second and fourth stages in the range D, and the first in the range 2, the 3-4 solenoid valve 42 is turned on causing a spool 41a of the valve 42 to be moved rightward so that a hydraulic passage L6, communicated with a release chamber 23d of the 2-4 brake 23, is connected with a draining passage.

When the shift stage is the third stage in the range d, second and third stage in the range 2 and the first and second stages in the range 1, the 3-4 solenoid valve 42 is turned off causing the spool 42a to be moved leftward so that the hydraulic passage L6 is connected with the passage L5 connected with the 2-3 shift vale 39. As a result, the introduction of the hydraulic pressure is controlled in accordance with the operation of the 2-3 shift valve 39.

The 3-4 shift valve 41 controls a communication between a hydraulic passage L7 connected with the port a of the manual shift valve 35 and a hydraulic passage L8 connected with the coast clutch 21 to thereby control the engagement and disengagement of the coast clutch 21. Thus, the operation of the 2-4 brake and 3-4 clutch 27 as frictional element can be accomplished through the control of solenoid valves 37, 40 and 42 as shown in Table 1.

The control circuit 30 is provided with a 1-2 accumulator 43, a 2-3 accumulator 44, a 2-3 timing valve 45, a 3-2 timing valve 46 and a bypass valve 47 between the shift valves 36, 39 and 41 and the 2-4 brake 23 and the 3-4 clutch 27 for reducing a torque shock caused by switching operations thereof.

In addition, the control circuit 30 is provided with a N-D accumulator 48 connected with a hydraulic passage L9 which supplies the hydraulic pressure from the port a of the manual shift valve 35 so as to engage the forward clutch 20 in the first and second stages of the range D, a N-R accumulator 49 connected with a hydraulic passage L10 which supplies the hydraulic pressure from the port f of the manual shift valve 35 so as to engage the reverse clutch 24 in the reverse range R, a lock-up control valve 50 for controlling the lock-up valve 29, a lock-up solenoid valve 51 for controlling the lock-up control valve 50 and a converter relief valve 52.

The control unit 100 controls the line pressure of the control circuit 30 in accordance with flow charts shown in FIGS. 4 through 6, FIG. 10, FIG. 11 and FIG. 14.

Figure 4:
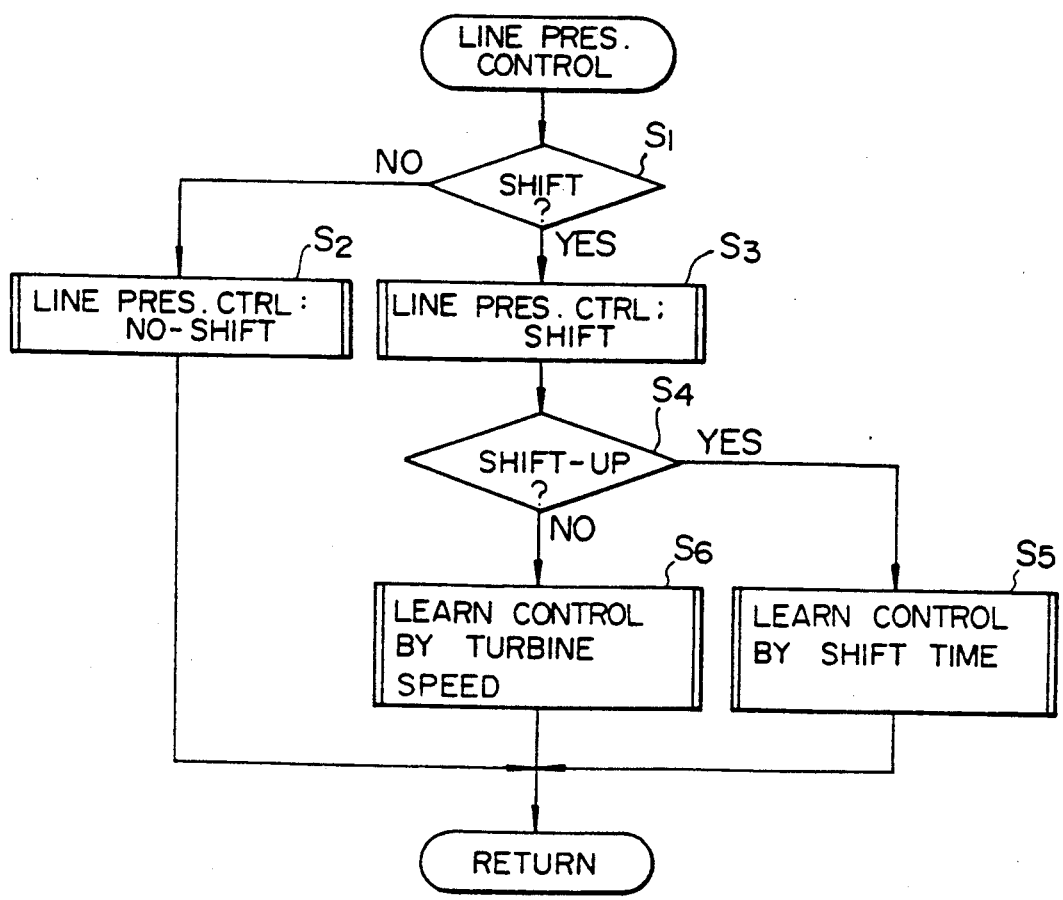
FIG. 4 is a flow chart of a main routine of a line pressure control.

Referring to FIG. 4, there is shown a main routine of the control for the hydraulic circuit 30.

Figure 5:
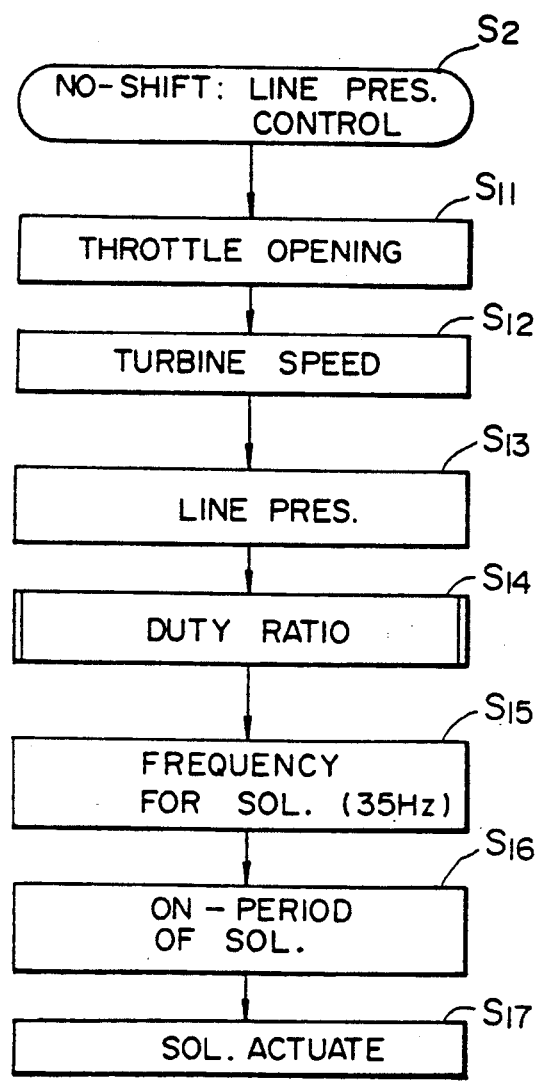
FIG. 5 is a flow chart of a routine of a line pressure control under a no-shift operation.
Figure 6:
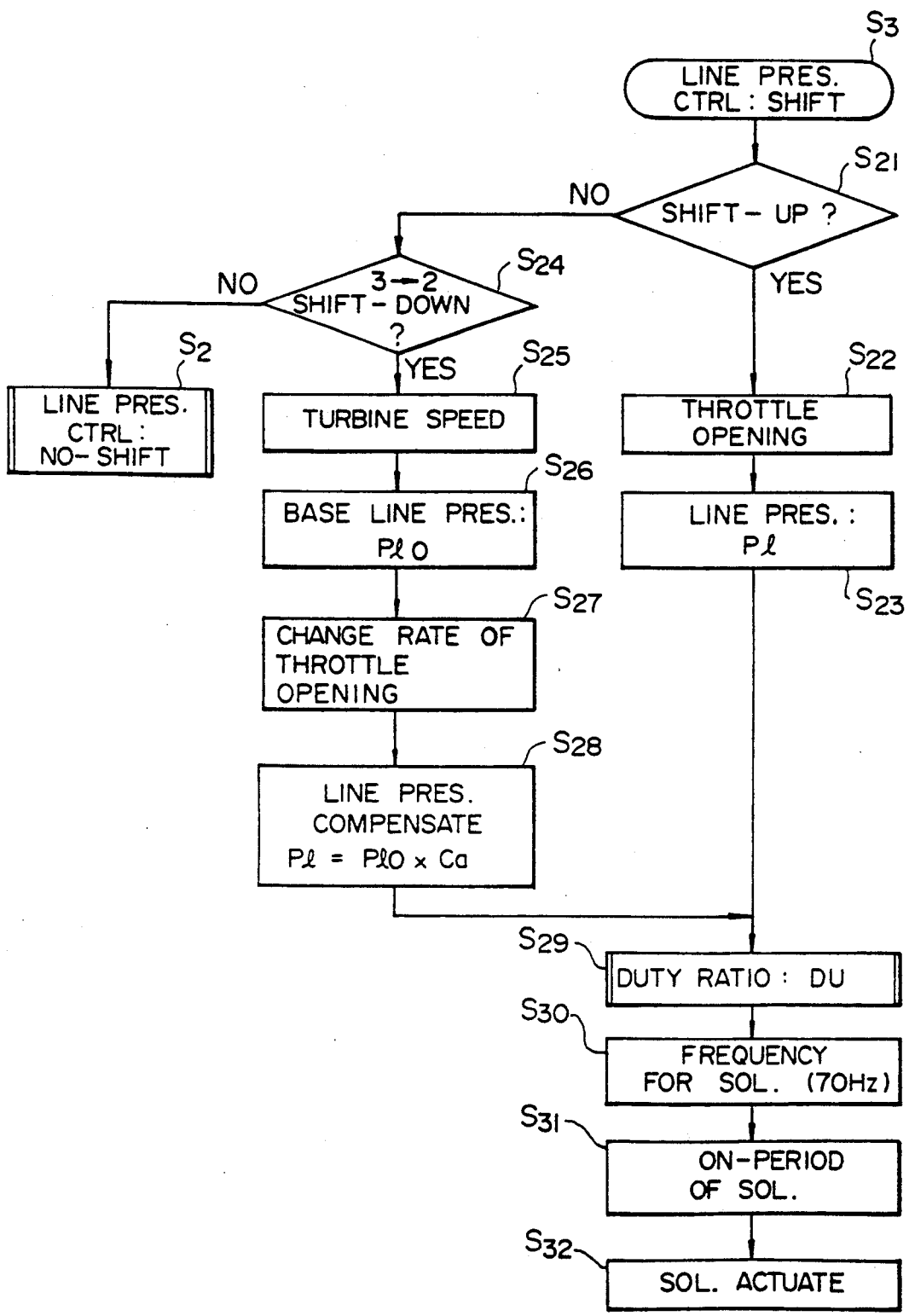
FIG. 6 is a flow chart of a routine of a line pressure control during a shift operation.
Figure 11:
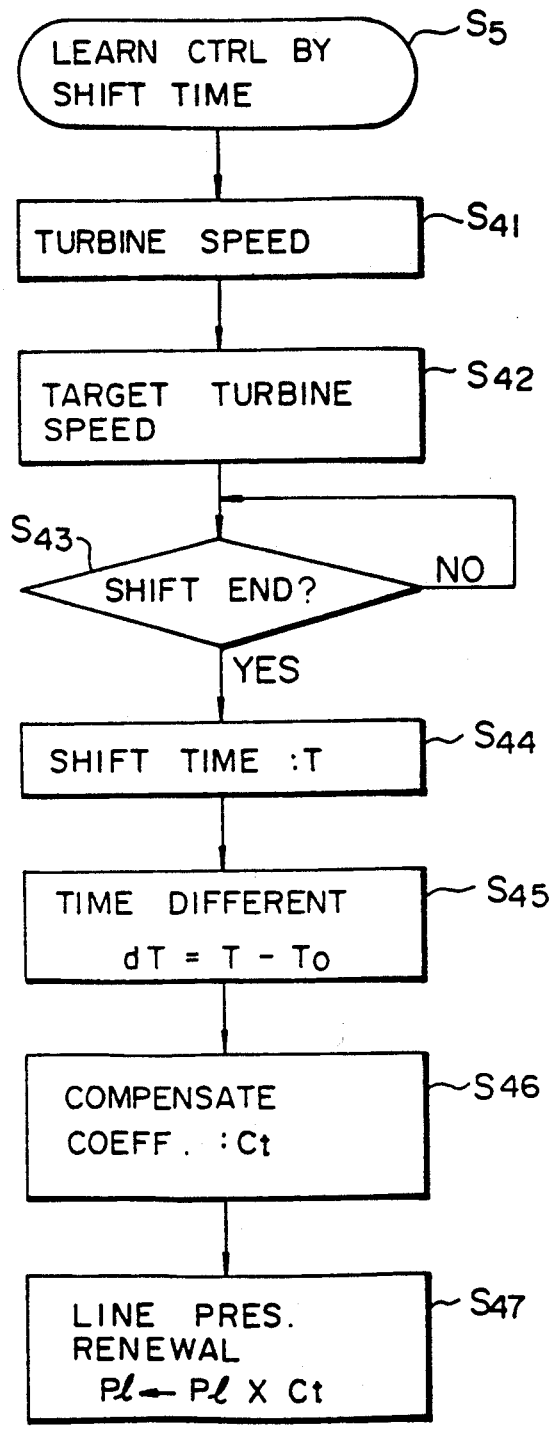
FIG. 11 is a flow chart of a routine for compensating the line pressure by means of a learning control based on a shift operation time period.

The control unit 100 judges as to whether or not the transmission AT is in a shift operation in light of the shift pattern in step S1. If the judgment is No or the transmission AT is not in the shift operation, the control unit 100 carries out, in step S2, a line pressure control in accordance with a routine provided for no-shift operation as shown in FIG. 5. If the judgment is Yes in step S1, the control unit 100 carries out, in step S3 a routine for the shift operation as shown in FIG. 6. Next, the control unit 100 judges whether or not a shift-up operation is made in step S4. If the judgment is Yes or the transmission AT is in the shift-up operation, the control unit 100 carries out a routine as shown in FIG. 11 in which the line pressure is controlled based on a learning of shift operation time period.

Figure 14:
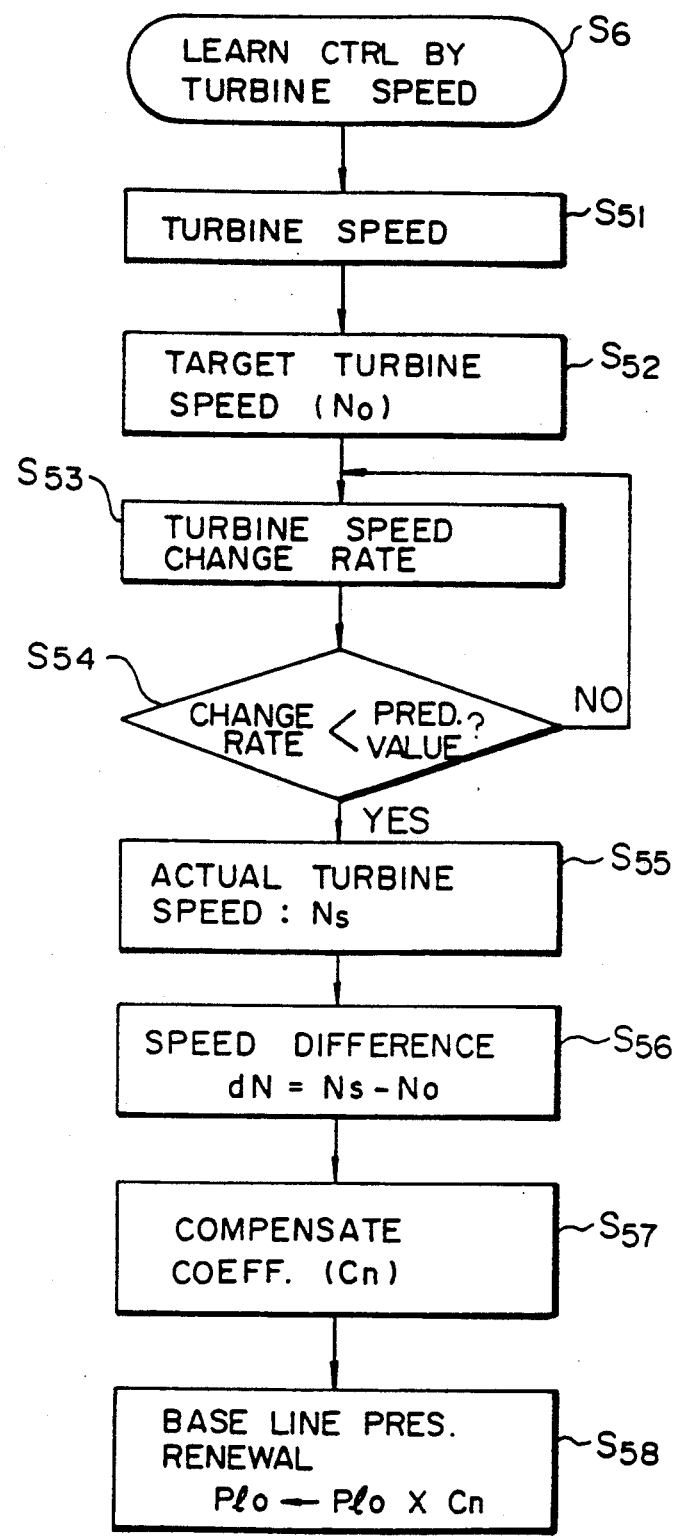
FIG. 14 is a flow chart of a routine for compensating the line pressure by means of a learning control based on the turbine speed change in a shift-down operation.

If the judgment is No or the transmission AT is in a shift-down operation, the control unit 100 carries out a routine as shown in FIG. 14 in which the line pressure is controlled based on a learning of a turbine speed increase. Then, the control unit 100 returns to the step S1.

In case of no-shift operation, the line pressure is controlled in accordance with the procedure shown in FIG. 5.

The control unit 100 reads the throttle opening and turbine speed from the sensors 101 and 102 respectively in step S11 and S12.

Next, the control unit 100 obtains the line pressure of the control circuit 30 in light of a map stored in a memory of the unit 100 in accordance with the throttle opening and the turbine speed. In step S14, the control unit 100 determines a duty ratio DU for the duty solenoid valve 33 in accordance with the line pressure obtained in step S13. The control unit 100 sets a frequency for actuating the solenoid valve 33, for instance 35 Hz in the illustrated embodiment, in step S15. In step S16, the control unit 100 determines the on-period in a single cycle by multiplying the duty ratio DU into a operating cycle. In step S17, the control unit 100 actuates the solenoid valve 33 in accordance with the result of step S16 so as to accomplish the line pressure obtained in step S13.

The line pressure control during the shift operation of step S3 in FIG. 4 is carried out in accordance with a routine shown in FIG. 6.

At first, the control unit 100 judges whether or not the shift operation is a shift-up operation in step S21. In a shift-up operation, the control unit 100 reads the throttle opening in step S22 and determines the line pressure P1 in accordance with the throttle opening and gear stages involved in the shift-up operation. It will be understood that according to the illustrated embodiment, in determining the line pressure P1, the gear stages are taken into account. For this purpose, the control unit 100 is provided in memory thereof with a map for obtaining the line pressure P1 in accordance with the throttle opening and the gear stages involved in the shift-up operation, as shown in FIG. 7(a).

Figures 7A, 7B:
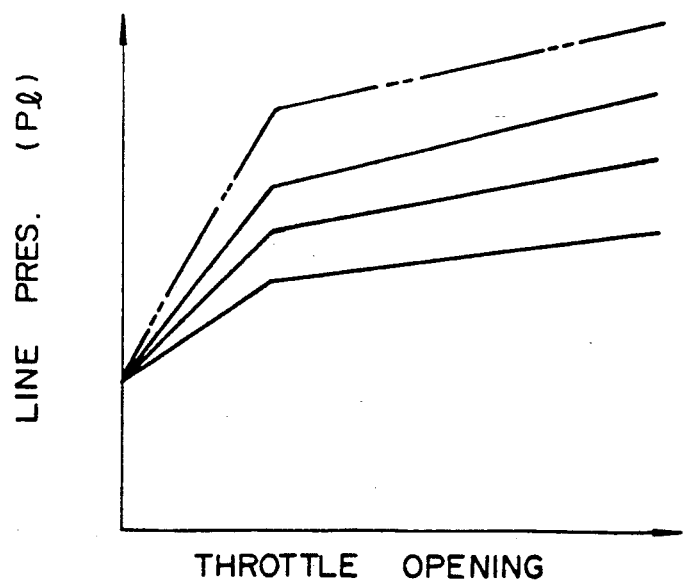
FIG. 7(a) shows a map providing a relationship between the line pressure, throttle opening and the gear stages involved in the shift operation.
FIG. 7(b) is a graphical representation showing a relationship between the throttle opening and the line pressure.

Resultant line pressure properties are obtained in accordance with gear stages involved in the shift operation as shown in FIG. 7(b). The line pressures obtained through the above procedure are lower than the value under a conventional control, as shown by a chain line. Thus, precise control of the line pressure can be accomplished by the present invention.

The line pressure obtained through step 23 will be further modified through the compensating procedure in FIG. 11 in order to optimize the value.

If the judgment of the step S21 is No, or the transmission AT is in a shift-down operation, the control unit 100 further judges whether or not the shift-down operation is a shift from the third to second stages in step S24. If Yes, the control unit 100 carries out steps S25 through S28. If No, the control in accordance with FIG. 5 is carried out. It is necessary to make a timing control for engagement of the 2-4 brake 23 when the shift-down is made from the third to second stages by controlling the line pressure. In other shift-down operations, there is no need to control the line pressure because only disengagement action occurs on the 3-4 clutch 27 and the 2-4 brake 23 in this embodiment.

In the shift-down operation from the third to second stages, the control unit 100 reads the turbine speed in step S25 and determines a base line pressure P10 in accordance with the turbine speed in step 26.

Figures 8, 9:
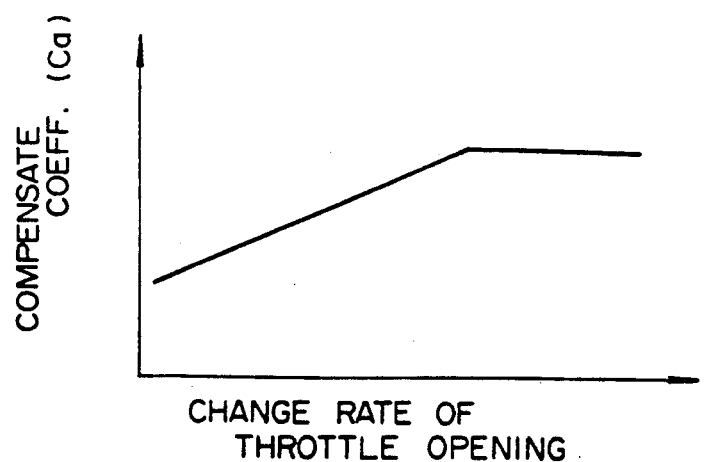
FIG. 8 shows a map providing a relationship between the line pressure, turbine speed and the gear stages involved in the shift operation.
FIG. 9 is a graphical representation showing a relationship between a throttle opening change speed and a coefficient for compensating the line pressure.

According to the procedure of the illustrated embodiment, the control unit 100 determines the base line pressure P10 based on a map stored in a memory thereof in which the base line pressure P10 is provided in accordance with the turbine speed as shown in FIG. 8. The base line pressure will be modified through a procedure of FIG. 14 in order to optimize the value.

The control unit 100 compensates the base line pressure P10 in accordance with a change speed in the throttle opening by employing and multiplying a compensation coefficient Ca into the base line pressure P10 in steps S27, S28. The coefficient is provided in accordance with the change speed in the throttle opening as shown in FIG. 9.

Next, the control unit 100 determines the duty ratio DU of the solenoid valve 33 in step S29, sets the actuating frequency for actuating the valve 33 in step S30, calculates on-period of the solenoid in step S31 and actuates the valve 33 in step S32 so as to accomplish the line pressure value obtained through the step S23 or S28. In this control, the solenoid actuating frequency may be set at 70 Hz higher than the value of step S15 in FIG. 5.

Figure 10:
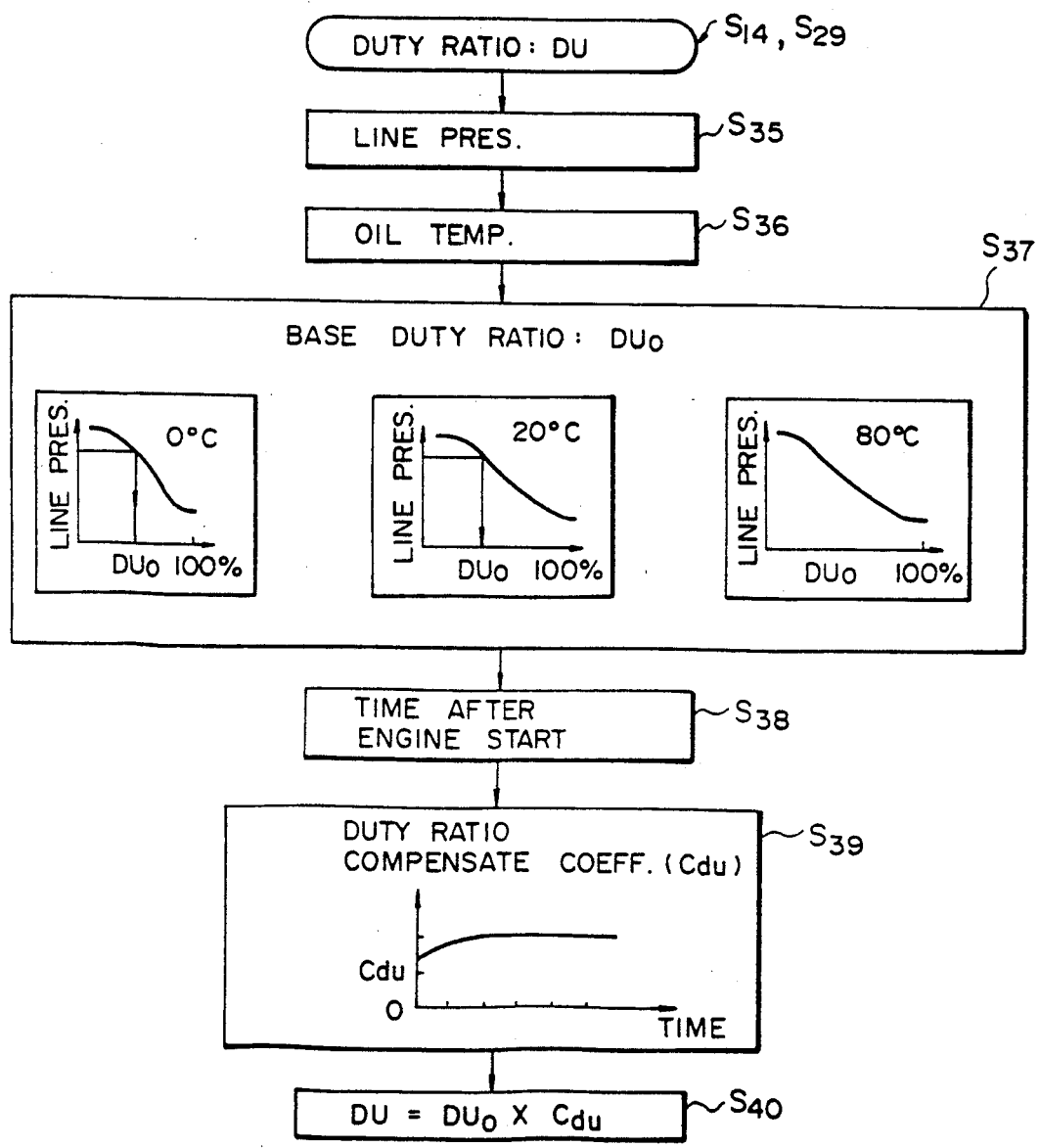
FIG. 10 is a flow chart of a routine for determining a duty ratio for a solenoid valve.

Referring to FIG. 10, there is shown a procedure for determining the duty ratio DU utilized in step S14 of FIG. 5 and in step S29 of FIG. 6.

The control unit 100 reads the line pressure in step S35 and reads a temperature of the hydraulic fluid in the transmission AT in step S36. In step S37, the control unit 100 determines a base duty ratio DU0 in accordance with the hydraulic fluid temperature. The control unit 100 is provided with maps providing the base duty ratio DU0 based on the line pressure. Several maps are prepared with regard to respective temperatures of the hydraulic fluid since the relationship between the line pressure and the base duty ratio DU0 is changed in accordance with the temperature of the hydraulic temperature for better control. An accurate value of the base duty ratio DU0 can be obtained by means of a linear interpolation utilizing two maps even when the temperature of the hydraulic fluid takes an intermediate value.

It is preferable to take into account the effect of air and the like in the hydraulic fluid at the initial stage of the operation of the transmission. For this purpose, in step S38, a time period is detected after starting engine. According to the illustrated control, a compensation coefficient Cdu is obtained through a map in accordance with the time period after starting engine. In step S40, the control unit 100 calculates the duty ratio DU by multiplying the coefficient Cdu into the base duty ratio DUO.

Referring to FIG. 11, there is shown a procedure for compensating the line pressure by means of a learning control of shift operation time period appeared in step 5 of FIG. 4.

This procedure is carried out for modifying the value of the line pressure obtained through step S23 of FIG. 6 and stored in the memory of the control unit 100 in accordance with the shift operation time period.

In the shift-up operation, the turbine speed gradually decreases as the engaging force of the frictional elements increases. The engaging speed or the change speed of the engaging force of the frictional elements relates to the shift operation time period. In view of the above, according to the illustrated embodiment, the line pressure is compensated in accordance with the shift operation time period.

Figure 12:
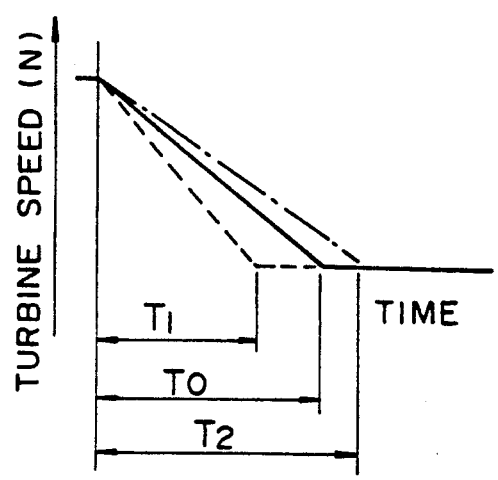
FIG. 12 is a graphical representation showing a turbine speed change during a shift-up operation.

The control unit 100 reads the turbine speed in step S41 and calculates a target turbine speed after the shift operation based on the actual turbine speed before the shift operation in step S42. In step S43, the control unit 100 finds the termination of the shift operation when the difference between the target turbine speed and the actual turbine speed is smaller than a predetermined value and a change rate of the turbine speed is smaller than a predetermined value. When the termination of the shift operation is found, the control unit 100 calculates the shift operation time period T in step S44. In step S45, the control unit 100 calculates a difference dT between the time period T and a target time period T0 which provides an appropriate speed change property of the turbine speed as shown by real line in FIG. 12.

Figure 13:
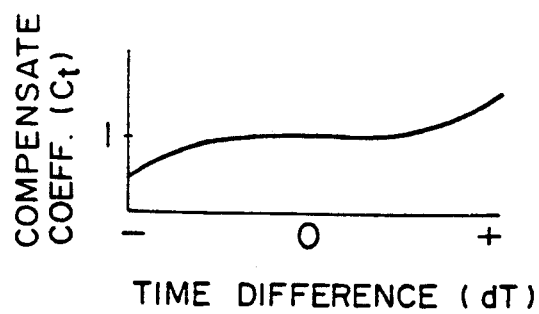
FIG. 13 is a graphical representation showing a property of a compensating coefficient based on the shift operation time period.

In step S46, the control unit 100 determines a coefficient Ct in accordance with the difference dT as shown in FIG. 13. As the difference dT approaches 0, the coefficient Ct approaches 1. As the difference dT increases in a negative direction or the shift operation time period T takes a value T1 smaller than the value T0 as shown by a broken line in FIG. 12, the coefficient Ct is reduced. When the difference dT increases in a positive direction or the shift operation time period T takes a value T2 larger than the target value T0 as shown in FIG. 13, the coefficient Ct is increased.

In step S47, the line pressure P1 stored in the memory of the control unit 100 is replaced by a value obtained by multiplying the line pressure P1 into the coefficient Ct and renewed. The renewed value P1 is employed in the subsequent line pressure control. Thus, the learning control based the shift operation time period can be accomplished.

The learning control can be based on the turbine speed change during the shift operation.

The learning control of the line pressure can be applied to the shift-down operation as well.

Referring to FIG. 14, there is shown a compensating routine in the form of flow chart. This compensating routine constitutes a content of step S6 in FIG. 4 in which the line pressure is compensated in view of a fluctuation of the turbine speed in case of shift operation of the transmission AT. The compensating routine modifies the value of the base line pressure P10 obtained through step S26 in FIG. 6 and stored in the memory of the control unit 100 by means of a learning control based on the fluctuation of the turbine speed.

The control unit 100 reads the turbine speed in step S51 and sets a target turbine speed N0 based on the turbine speed just before the shift operation in step S52.

The control unit 100 calculates turbine speed change rate in step S53 and judges whether or not the turbine speed change rate is smaller than a predetermined value in step S54. If the turbine speed change rate is not smaller than the predetermined value, the control unit 100 returns to the step S53. When the turbine speed change rate is smaller than the predetermined value, the control unit 100 reads the turbine speed Ns just after the turbine speed change rate is reduced below the predetermined value in step S55 and calculates a speed difference dN between the actual turbine speed Ns and the target turbine speed N0. In the illustrated embodiment, the turbine speed Ns exists in the vicinity of points x1, x0, x2 which are extreme points in respective turbine speed curves in FIG. 15.

Figure 16:
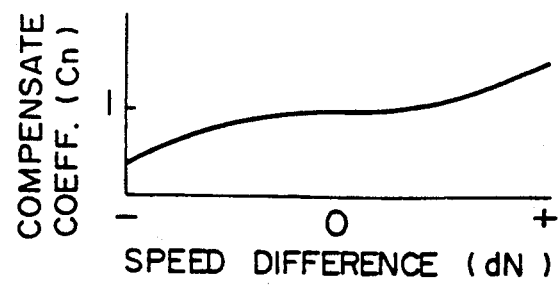
FIG. 16 is a graphical representation showing a property of a compensating coefficient based on the turbine speed change in the shift-down operation.

The control unit 100 determines a compensating coefficient Cn in light of a map as shown FIG. 16 in accordance with the speed difference dN in step S57.

As the speed difference dN approaches 0, the coefficient approaches 1. If the speed difference dN increases in a positive direction as shown by a chain line in FIG. 15, the coefficient Cn is increased. If the speed difference dN increases in a negative direction as shown by a broken line in FIG. 15, the coefficient Cn is reduced, as shown in FIG. 16.

In step S58, the control unit 100 replaces the value of the base line pressure P10 by a new value which is obtained by multiplying the coefficient Cn into the value P10. The renewed line pressure P10 is stored in the memory and utilized for the subsequent control. Thus, the learning control of the line pressure based on the turbine speed change rate can be accomplished.

Figure 15:
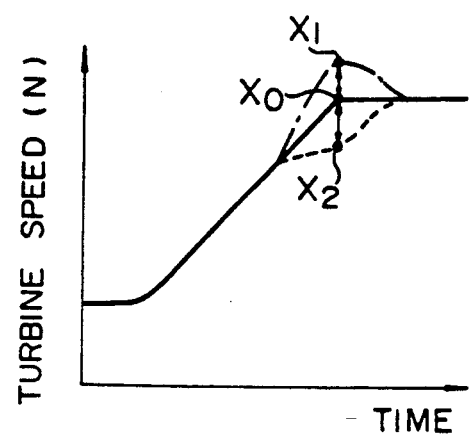
FIG. 15 is a graphical representation showing the turbine speed change during the shift-down operation.

According to the learning control of the illustrated embodiment in the case of shift-down operation, the line pressure is modified to be increased when the turbine speed is increased as shown by the chain line in FIG. 15. On the other hand, the line pressure is modified to be reduced when the turbine speed is decreased as shown by the broken line.

The modified value of the line pressure is used for the subsequent line pressure control as a base value. Thus, the learning control according to the illustrated embodiment functions to lead the turbine speed change during the shift operation to a smaller value. As a result, the toque shock due to the shift operation can be effectively reduced by utilizing the above mentioned line pressure learning control.

Although the learning control of the line pressure based on the turbine speed is explained in connection with a shift-down operation, the control can be applied to the shift-up operation.

It will be apparent that various modifications and improvements may be made based on the above descriptions by those skilled in the art without departing from the spirits of the present invention, and all which fall within the scope of the claims as attached.

We claim:

1. A hydraulic pressure control system for an automatic transmission comprising:
a transmission gear mechanism having a plurality of gear stages and frictional elements for switching power transmitting paths in the transmission gear mechanism,
hydraulic control means for controlling engagement and disengagement of the frictional elements to establish one of said gear stages,
line pressure control means for controlling line pressure of said hydraulic control means, speed detecting means for detecting an actual speed of an input element of the transmission gear mechanism during a shift operation switching the gear stage of the transmission gear mechanism, electronic control means for detecting a shift operation, based on a signal from the speed detecting means, and determining an end to said shift operation from a difference between a target speed and said actual speed of said input element, calculating an actual shift operation time period based on the end to said shift operation, calculating a time difference between said actual shift operation time period and a target time period, and determining a compensation coefficient, based on said time difference, when said shift operation is a shift-up operation, and determining a speed change rate of the input element, based on the actual speed of the input element, when said shift operation is a shift-down operation, and compensation means for compensating the line pressure based on a signal from the electronic control means representing said compensation coefficient.

2. A hydraulic pressure control system as recited in claim 1 wherein said electronic control means includes target time setting means for setting said target time period for the shift operation.

3. A hydraulic pressure control system as recited in claim 2 wherein said compensation means reduces the line pressure when the actual shift operation time period is smaller than the target time period.

4. A hydraulic pressure control system as recited in claim 2 wherein said compensation means increases the line pressure when the actual shift operation time period is longer than the target time period.

5. A hydraulic pressure control system as recited in claim 1 wherein said compensation means compensates the line pressure by means of a second compensation coefficient determined by a learning control based on the actual speed of the input element.

6. A hydraulic pressure control system as recited in claim 5 wherein said compensation means reduces the line pressure when the actual speed of the input element is smaller than a target speed.

7. A hydraulic pressure control system as recited in claim 5 wherein said compensation means increases the line pressure when the actual speed of the input element is greater than the target speed.

8. A hydraulic pressure control system for an automatic transmission comprising:

a transmission gear mechanism having a plurality of gear stages and frictional elements for switching power transmitting paths in the transmission gear mechanism, hydraulic control means for controlling engagement and disengagement of the frictional elements to establish one of said gear stages, line pressure control means for controlling line pressure of said hydraulic control means, speed detecting means for detecting an actual speed of an input element of the transmission gear mechanism during a shift operation switching the gear stage of the transmission gear mechanism, electronic control means for detecting a shift operation, based on a signal from the speed detecting means, and further determining a compensation coefficient, and a speed change rate of the input element based on the actual speed of the input element, when said shift operation is a shift-down operation, and compensation means for compensating the line pressure based on a signal from the electronic control means representing said compensation coefficient.

* * * * *